US009203471B2

(12) United States Patent
Luo et al.

(10) Patent No.: US 9,203,471 B2
(45) Date of Patent: Dec. 1, 2015

(54) DATA TRANSMISSION COORDINATION OVER DIGITAL SUBSCRIBER LINES

(71) Applicant: Futurewei Technologies, Inc., Plano, TX (US)

(72) Inventors: Yuanqiu Luo, Cranbury, NJ (US); Frank Effenberger, Colts Neck, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 115 days.

(21) Appl. No.: 14/053,002

(22) Filed: Oct. 14, 2013

(65) Prior Publication Data

US 2014/0105604 A1 Apr. 17, 2014

Related U.S. Application Data

(60) Provisional application No. 61/714,539, filed on Oct. 16, 2012.

(51) Int. Cl.
*H04J 14/08* (2006.01)
*H04B 3/32* (2006.01)
(Continued)

(52) U.S. Cl.
CPC ... *H04B 3/32* (2013.01); *H04J 3/10* (2013.01); *H04J 3/1694* (2013.01); *H04L 25/085* (2013.01); *H04L 25/14* (2013.01)

(58) Field of Classification Search
CPC .......... H04Q 11/0407; H04Q 11/0457; H04Q 11/0471
See application file for complete search history.

(56) References Cited

U.S. PATENT DOCUMENTS

2005/0220180 A1* 10/2005 Barlev et al. .................. 375/222
2007/0109974 A1   5/2007 Cutillo et al.
(Continued)

FOREIGN PATENT DOCUMENTS

EP    2157809 B1   8/2013
WO    2009038669 A1   3/2009

OTHER PUBLICATIONS

Chunming, Q., et al., "A Time Domain Approach for Avoiding Crosstalk in Optical Blocking Multistage Interconnection Networks," Journal of Lightwave Technology, vol. 12, No. 10, Oct. 1, 1994, pp. 1854-1862.

(Continued)

*Primary Examiner* — Dzung Tran
(74) *Attorney, Agent, or Firm* — Conley Rose, P.C.; Grant Rodolph; Brandt D. Howell

(57) ABSTRACT

An optical management node comprising a memory comprising instructions, a processor coupled to the memory and configured execute the instructions, wherein executing the instructions causes the processor to schedule data transmissions across an electrical network between a plurality of user terminals and an optoelectrical interface by using time division multiplexing or time division multiple access based on optimization of crosstalk performance of electrical lines of the electrical network, and a transmitter coupled to the processor and configured to transmit schedule information to the optoelectrical interface via an optical network. Also disclosed is a method implemented in a management node comprising scheduling data transmissions with a plurality of user terminals across a Digital Subscriber Line (DSL) network using time division scheduling based on optimization of crosstalk performance of DSL lines of the DSL network, and transmitting schedule information to the user terminals via an optical network.

12 Claims, 5 Drawing Sheets

(51) Int. Cl.
*H04L 25/08* (2006.01)
*H04L 25/14* (2006.01)
*H04J 3/10* (2006.01)
*H04J 3/16* (2006.01)

(56) References Cited

U.S. PATENT DOCUMENTS

2007/0140288 A1* 6/2007 Boyd et al. .................... 370/442
2009/0060067 A1* 3/2009 Guenach et al. ............. 375/260
2010/0074312 A1* 3/2010 Cioffi et al. ................... 375/222
2010/0316387 A1* 12/2010 Suvakovic ...................... 398/98
2011/0255866 A1* 10/2011 Van Veen et al. ............... 398/35
2012/0183289 A1 7/2012 Lou et al.

OTHER PUBLICATIONS

Foreign Communication From a Counterpart Application, PCT Application No. PCT/US2013/064848, Invitation to Pay Additional Fees dated Nov. 28, 2013, 7 pages.

Foreign Communication From a Counterpart Application, PCT Application No. PCT/US2013/064848, International Search Report dated Feb. 21, 2014, 7 pages.

Foreign Communication From a Counterpart Application, PCT Application No. PCT/US2013/064848, Written Opinion dated Feb. 21, 2014, 9 pages.

* cited by examiner

DATA TRANSMISSION COORDINATION OVER DIGITAL SUBSCRIBER LINES

CROSS-REFERENCE TO RELATED APPLICATIONS

The present application claims priority to U.S. Provisional Patent Application 61/714,539 filed Oct. 16, 2012 by Yuanqiu Luo, et. al., and entitled "Data Transmission Coordination Over Multiple Digital Subscriber Lines," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A Passive Optical Network (PON) may be a point-to-multipoint network of unpowered optical splitters and combiners that may be employed for high speed transmission of data between a service provider and the general vicinity of a plurality of end users. Due to the high cost of laying optical fiber, PON components may be coupled to existing local electrical networks to support communication from the edge of the PON to the end users. For example, a PON may connect to a plurality of users via a Digital Subscriber Line (DSL) system. DSL may be a family of technologies that may provide Internet and/or other network access via transmission of digital data over local telephone networks.

SUMMARY

In one embodiment, the disclosure includes an optical management node comprising a memory comprising instructions, a processor coupled to the memory and configured execute the instructions, wherein executing the instructions causes the processor to schedule data transmissions across an electrical network between a plurality of user terminals and an optoelectrical interface by using time division multiplexing or time division multiple access based on optimization of crosstalk performance of electrical lines of the electrical network, and a transmitter coupled to the processor and configured to transmit schedule information to the optoelectrical interface via an optical network.

In another embodiment, the disclosure includes a method implemented in a management node comprising scheduling data transmissions with a plurality of user terminals across a DSL network using time division scheduling based on optimization of crosstalk performance of DSL lines of the DSL network, and transmitting schedule information to the user terminals via an optical network.

In another embodiment, the disclosure includes a method comprising scheduling, by an Optical Line Terminal (OLT), data transmissions across a DSL network between an Optical Network Unit (ONU) and a plurality of user terminals, wherein all non-data transmitting DSL lines are deactivated, calculating a transfer matrix to represent the DSL network, and reducing the transfer matrix by removing values associated with deactivated DSL lines.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
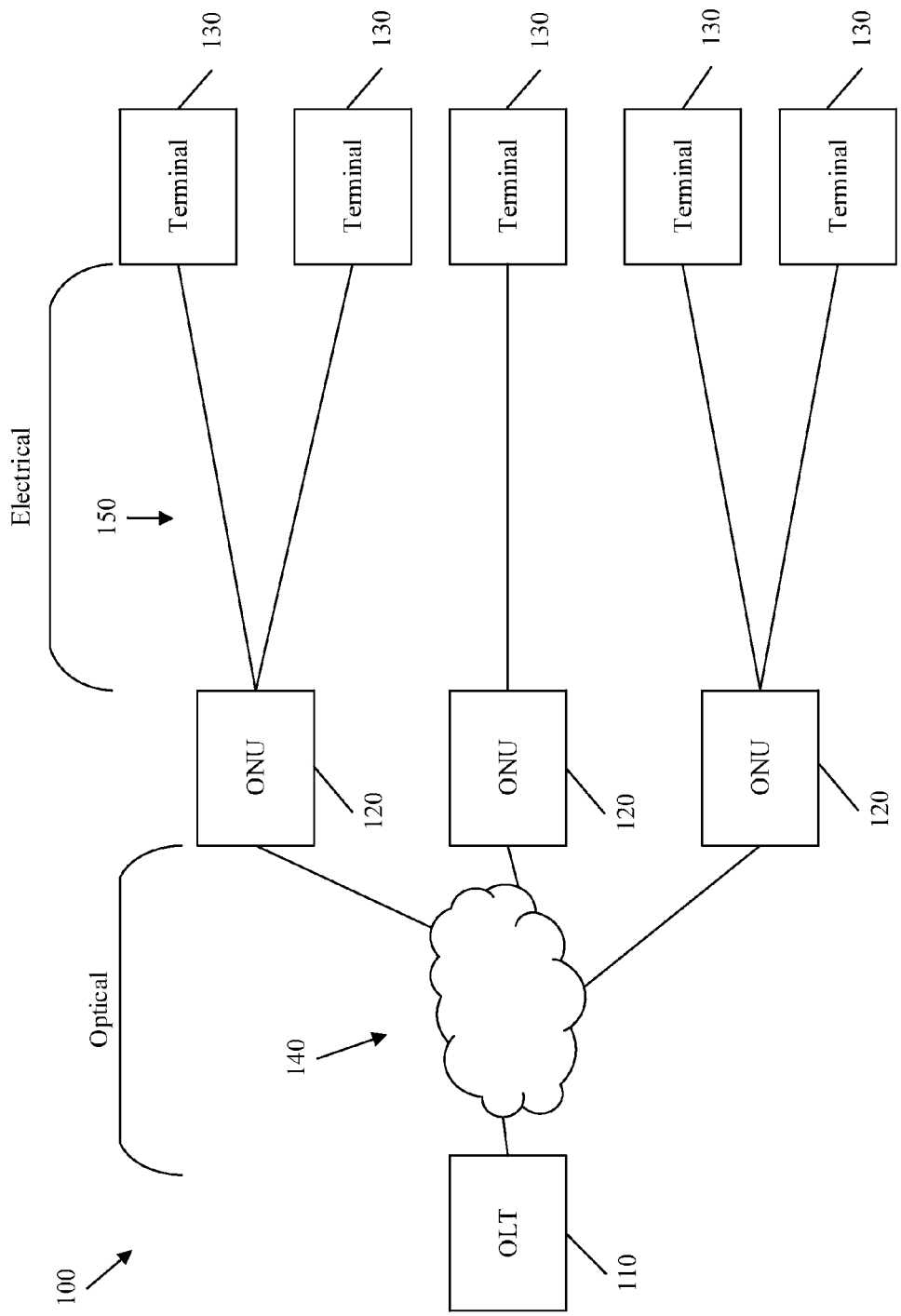
FIG. 1 is a schematic diagram of an embodiment of an optoelectrical network architecture.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A PON may be coupled to a DSL network at an Optical Network Unit (ONU). An ONU may be implemented as part of a fiber-to-the-drop (FTTdp) access network that may support next generation DSL technologies such as International Telecommunication Union (ITU) Telecommunication Standard Sector (ITU-T) document G.9700 (G.fast) networks. A drop point at an ONU may support one or more (e.g. one, eight, etc.) electrical lines, which may be made of copper or a similar material and may be positioned in close proximity. Electrical current passing through a line may induce current in neighboring lines. Such induced current may be referred to as cross-talk. Cross-talk between lines may result in signal degradation in all closely positioned lines that are actively communicating at a specified time. Increases in cross-talk and associated signal degradation may result in a significant decrease in overall communication speed. DSL lines may be configured to transmit signals at all times in a data driven manner and may transmit dummy packets when no data is present. As such, DSL lines may each be active at all times and may not be configured to coordinate data transmissions. System components may be configured to compensate for cross-talk in related lines by employing vectoring and associated technologies. Such compensation may result in complex calculations and significant control signaling between components.

Disclosed herein is a mechanism for optimizing an optoelectrical network to reduce electrical crosstalk by employing time division multiplexing. Transmitters and/or receivers in the electrical network may be deactivated and/or muted when no data is present. Removing data traffic from the electrical lines may remove and/or substantially reduce associated cross talk. Transmissions over the electrical portion of the network may be scheduled using time division multiplexing (TDM) such that electrical lines tending to suffer from crosstalk may not actively transmit data at the same time. Such TDM may be accomplished by disallowing overlapping transmissions by electrical lines with a measured cross-talk value in excess of a threshold, which may be referred to as semi-TDM, and/or by disallowing overlapping transmissions by electrical lines coupled to a common optoelectrical interface component, which may be referred to as pure TDM. In either case, the cross-talk value associated with the deactivated lines may be removed from an associated transfer matrix, which may simplify the transfer matrix. A simplified transfer matrix may result in a substantially simplified cross-talk transfer matrix based on the transfer matrix. The cross-talk transfer matrix may be transmitted to end nodes and/or the optoelectrical interface components to perform cross-talk compensation. A simplified cross-talk transfer matrix may reduce signaling overhead between a management node (e.g. an OLT), the optoelectrical interface (e.g. the ONUs), and the end points (e.g. user terminals). A simplified cross-talk transfer matrix may also reduce the design complexity of the optoelectrical interface), and the end points by reducing the complexity of cross-talk compensation procedures that are based on the cross-talk transfer matrix. The TDM mechanism disclosed herein may also substantially eliminate loss of data frames associated with electrical cross-talk, which may significantly increase overall communication speed by reducing associated retransmissions.

FIG. 1 is a schematic diagram of an embodiment of an optoelectrical network 100 architecture. Network 100 may comprise an OLT 110 coupled to a plurality of ONUs 120 by an optical network 140. Network 100 may further comprise a plurality of terminals 130 coupled to the ONUs 120 by an electrical network 150. The OLT 110 may schedule transmissions across the optical network 140 and/or the electrical network 150. The OLT 110 may also determine a cross-talk cancellation matrix, which may be employed by the ONUs 120 and/or the terminals 130 to compensate for cross-talk on the electrical network 150. The OLT 110 may transmit schedule data and/or the cross-talk cancellation matrix to the ONUs 120 via the optical network 140 and/or the terminals 130 via the optical network 140, ONUs 120, and the electrical network 150. The ONUs 120 may schedule transmissions and/or compensate for cross talk based on data received from the OLT 110. The terminals 130 may schedule transmissions and/or compensate for cross talk based on data received from the OLT 110 and the ONUs 120.

The OLT 110 may be any device that is configured to support communication between the ONUs 120 and an upstream network such as the Internet. For example, network 100 may act as an access network to an upstream service provider's core network, and the OLT 110 may act as an intermediary between the upstream network and the ONUs 120. The OLT 110 may forward data received from the upstream network to the ONUs 120, and forward data received from the ONUs 120 onto the upstream network. Although the specific configuration of the OLT 110 may vary depending on the type of network 100, in an embodiment, the OLT 110 may comprise a transmitter and a receiver. When the upstream network uses a network protocol, such as Ethernet or Synchronous Optical Networking/Synchronous Digital Hierarchy (SONET/SDH), that is different from a Passive Optical Network (PON) protocol used in the network 100, the OLT 110 may comprise a converter that converts the network protocol into the PON protocol. The OLT 110 converter may also convert the PON protocol into the network protocol. The OLT 110 may be located at a central location, such as a central office, but may also be located at other locations as well. The OLT 110 may also act as a management node for network 100 and may be configured to manage communications across network 100. For example, the OLT 110 may schedule downstream communications according to the needs of network 100, encode associated data in Open Systems Interconnect (OSI) layer two frames (e.g. comprising layer three packets), encode scheduling data in associated frame headers, and forward the data frames downstream. The OLT 110 may also receive upstream transmission requests from downstream components. The OLT 110 may schedule such upstream communications in the form of time based transmission grants and may include the grants in the headers of the downstream data frames. Although the terms upstream and downstream may be used throughout to denote the locations of various network features relative to the OLT 110 or a similar unit, those skilled in the art will appreciate that the data flow on the network 100 in the embodiments of the disclosure is bi-directional.

The optical network 140 may also be referred to as an optical distribution network (ODN). Optical network 140 may be a PON based data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the ONUs 120. Alternatively, the optical network 140 may comprise one or a plurality of active components, such as optical amplifiers. The optical network 140 may extend from the OLT 110 to the ONUs 120 in a branching configuration, but may be alternatively configured in any other point-to-multipoint configuration.

The ONUs 120 may be any devices that are configured to communicate with the OLT 110 and one or more end nodes such as terminals 130. For example, the ONUs 120 may act as an intermediary between the OLT 110 and customers via terminals 130. For instance, the ONUs 120 may forward data received from the OLT 110 to the terminals 130, and forward data received from the terminals 130 on to the OLT 110. Although the specific configuration of the ONUs 120 may vary depending on the type of network 100, in an embodiment, the ONUs 120 may comprise an optical transmitter and an optical receiver configured to send and receive optical signals, respectively, to/from the OLT 110 via optical network 140. Additionally, the ONUs 120 may comprise a converter that may convert downstream optical signals into electrical signals and upstream electrical signals into optical signals for transmission toward the terminals 130 and/or the OLT 110, respectively. For example downstream electrical signals may be converted to employ Ethernet and/or asynchronous transfer mode (ATM) protocol. The ONUs 120 may also comprise an electrical transmitter and/or receiver that may send and/or receive the electrical signals to the terminals. The ONUs 120 may also comprise processor(s) and/or memory, which may be configured to store and/or queue upstream and/or downstream data and schedule transmissions, for example by using TDM, based on schedule data from the OLT 110. In some embodiments, ONUs 120 and optical network terminals (ONTs) are similar, and thus the terms are used interchangeably herein. The ONUs 120 may be located at distributed locations, such as the customer premises, but may be located at other locations as well.

The electrical network 150 may be similar to any known wired electrical communication system. For example, the network 150 may also be a point-to-point network, a point-to-multipoint network, or combinations thereof Electrical network 150 may comprise electrical lines such as coaxial cables, telephone cables, Ethernet cables, or any other electrical based wired transfer medium, for example any wire that is susceptible to electrical cross-talk. Electrical network 150 may also comprise amplifiers, taps, cascade taps, splitters, and/or other devices commonly associated with electrical networks. As a specific example, electrical network 150 may be configured as a DSL network. For example, electrical network 150 may comprise telephone cables and associated equipment originally installed on a premises for transmission of analog telephone communications and repurposed to support digital data transmission between the edge of the optical network 140 (e.g. at an ONU 120) and a user connecting via a terminal 130. Connecting optical network 140 directly to a terminal 130 may be costly. By employing electrical network(s) 150 commonly installed in existing structures, data can be transmitted to end users at high speeds generally associated with optical network 140 without incurring the costs of installation of optical fiber inside the structures (e.g. buildings) housing the terminals 130. Employing such electrical networks 150 may be effective as long as the nature of the electrical networks 150 do not unreasonably impair the overall communication speed of network 100.

The terminals 130 may be any devices configured to interface with a user or a user device. For example, the terminals 130 may include desktop computers, laptop computers, tablets, mobile telephones, residential gateways, televisions, set-top boxes, routers, switches, and similar devices.

The OLT 110 may transmit data frames and/or packets to the terminals 130 via the ONUs 120 and vice versa. An OLT 110 may communicate with one or many ONUs 120, and an ONU 120 may communicate with one or many terminals 130. When data or other transmissions such as dummy packets traverse an electrical line of the electrical network 150, current may be induced in neighboring electrical lines. Such induced current may be referred to as cross-talk and may cause signal degradation between related lines, for example between electrical lines that are part of the same cable and/or electrical lines that are positioned in close proximity due to a connection to a common ONU 120. Network 100 may reduce, eliminate, and/or optimize for cross-talk by employing TDM across the electrical network 150. Electrical network 150 may not transmit dummy packets and/or frames. A dummy packet may be any packet that contains no usable data and is transmitted solely to maintain an active connection. By eliminating dummy packets, the lines of the electrical network may remain inactive when not in use so as to reduce cross talk. Packets and/or frames may be transmitted across electrical network 150 in scheduled time slots instead of being transmitted in a data driven manner. The transmissions may be scheduled by the OLT 110 and related schedule data may be transmitted to the ONUs 120 and/or the terminals 130 in downstream frame headers. In an embodiment, electrical transmissions may be scheduled using pure TDM, in which no transmissions may temporally overlap in electrical lines coupled to a common ONU 120. In another embodiment, electrical transmissions may be scheduled using semi-TDM, in which transmissions may not temporally overlap in electrical lines pairs and/or groups when cross-talk (as measured by network 100 components) exceeds a predetermined and/or administrator specified threshold value. By optimizing network 100 to reduce cross-talk, vectoring algorithms associated with, for example, G.fast technology may be significantly simplified, which may simplify and/or improve the performance of network 100 components and associated cross-talk compensation algorithms. It should be noted that TDM as used herein may refer to any manner of communicating a plurality of signals over a path such that each signal occupies the path for only a fraction of a time period in an alternating pattern. A person of ordinary skill in the art will appreciate that term TDM may comprise many variants. For example, TDM may be used for downstream scheduling while an analogous technology, Time Division Multiple Access (TDMA), may be applied in substantially the same manner for upstream scheduling. For the sake of simplicity, time division scheduling and/or TDM as used herein may refer to TDM and/or TDMA unless specified.

Figure 2:
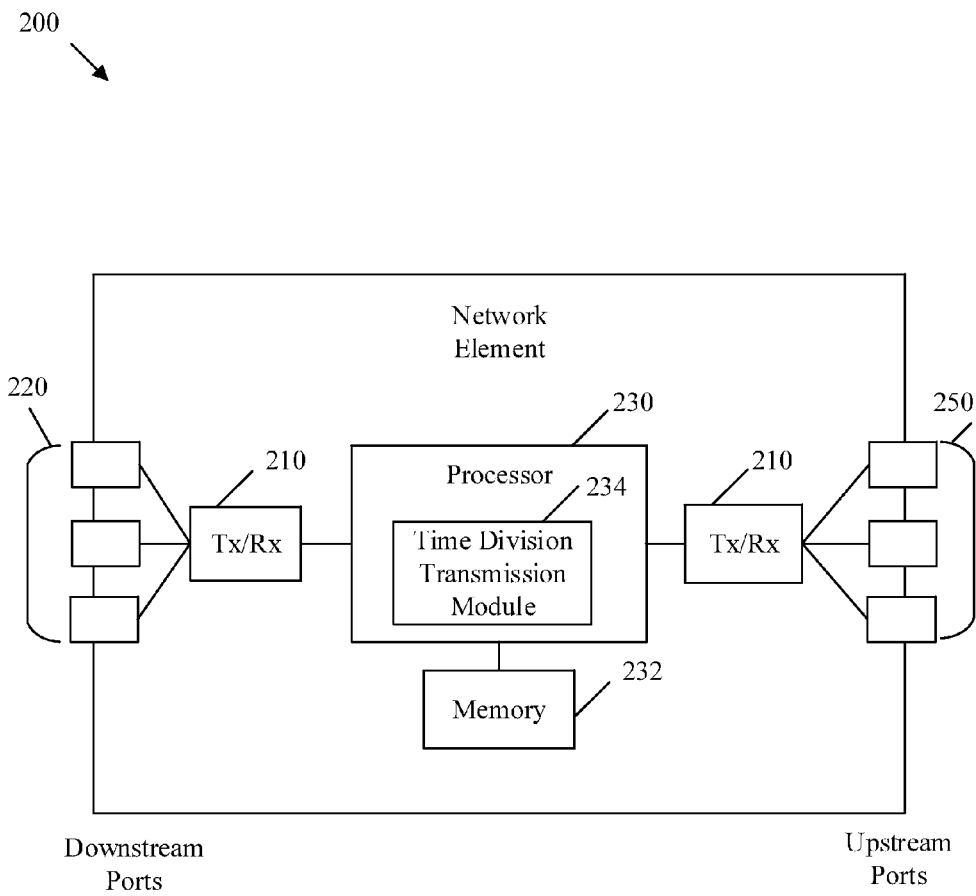
FIG. 2 is a schematic diagram of an embodiment of a Network Element (NE) within an optoelectrical network.

FIG. 2 is a schematic diagram of an embodiment of a NE 200 within an optoelectrical network, such as an OLT 110, ONU 120, and/or terminal 130. NE 200 may be configured to employ TDM to schedule electrical transmissions, transmit electrical transmissions according to a schedule, and/or perform vectoring based on the transmission schedule. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure may be implemented in a network apparatus or component such as a NE 200. For instance, the features/methods in the disclosure may be implemented using hardware, firmware, and/or software installed to run on hardware. The NE 200 may be any device that transports frames through a network, e.g., a switch, router, bridge, server, a client, etc. As shown in FIG. 2, the NE 200 may comprise transceivers (Tx/Rx) 210, which may be transmitters, receivers, or combinations thereof A Tx/Rx 210 may be coupled to a plurality of downstream ports 220 (e.g. downstream interfaces) for transmitting and/or receiving frames from other nodes and a Tx/Rx 210 coupled to a plurality of upstream ports 250 (e.g. upstream interfaces) for transmitting and/or receiving frames from other nodes, respectively. A processor 230 may be coupled to the Tx/Rxs 210 to process the frames and/or determine which nodes to send frames to. The processor 230 may comprise one or more multi-core processors and/or memory devices 232, which may function as data stores, buffers, etc. Processor 230 may be implemented as a general processor or may be part of one or more application specific integrated circuits (ASICs) and/or digital signal processors (DSPs). Processor 230 may comprise a time division transmission module 234, which may perform TDM based scheduling, vectoring, and/or any other electrical cross-talk optimization functions. In an alternative embodiment, the time division transmission module 234 may be implemented as instructions stored in memory 232, which may be executed by processor 230, or implemented in part in the processor 230 and in part in the memory 232. In another alternative embodiment, the time division transmission module 234 may be implemented on separate NEs. The downstream ports 220 and/or upstream ports 250 may contain electrical and/or optical transmitting and/or receiving components.

It is understood that by programming and/or loading executable instructions onto the NE 200, at least one of the processor 230, time division transmission module 234, Tx/Rxs 210, memory 232, downstream ports 220, and/or upstream ports 250 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
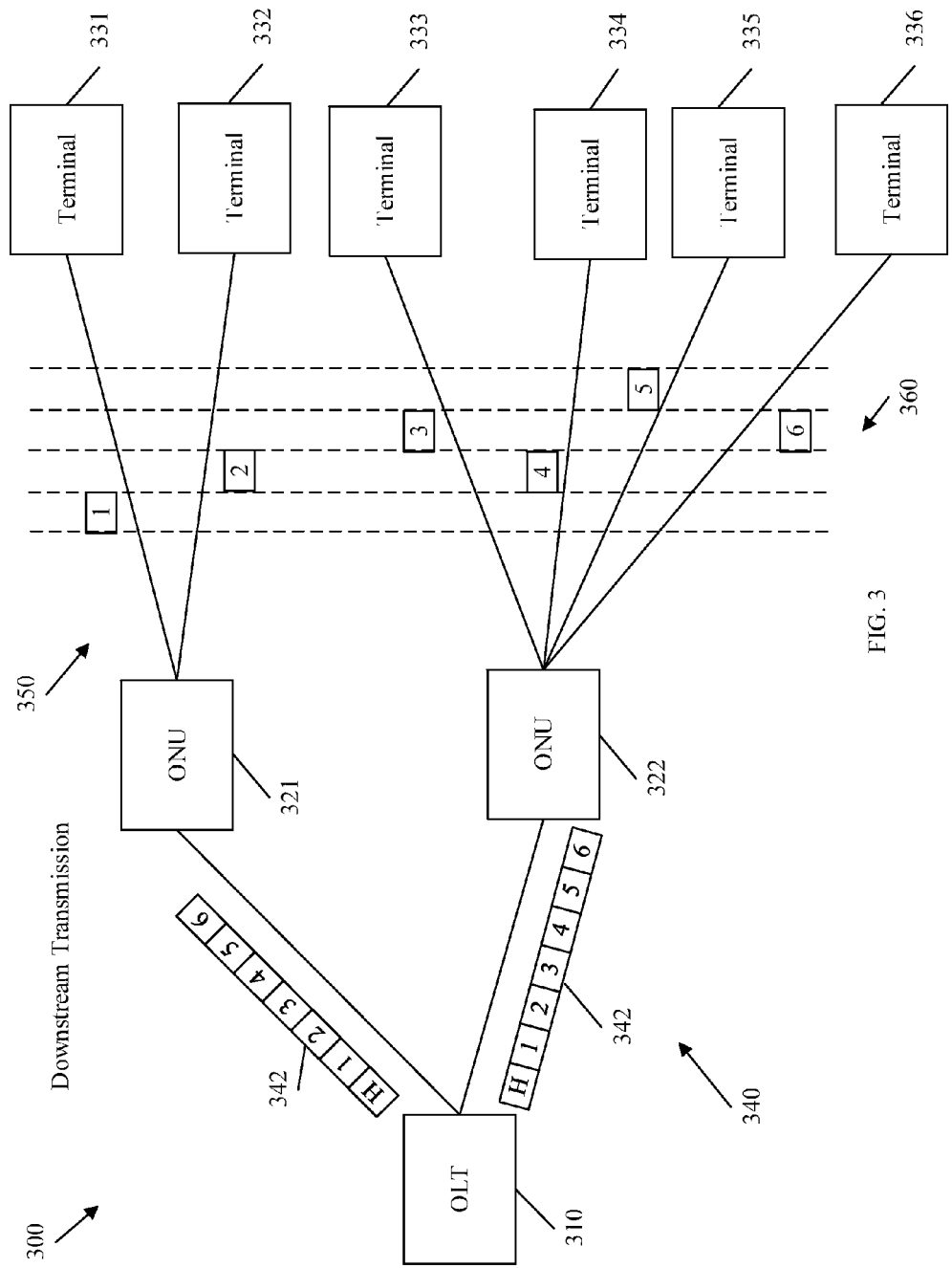
FIG. 3 is a schematic diagram of an embodiment of an optoelectrical network performing downstream transmissions by employing time division multiplexing.

FIG. 3 is a schematic diagram of an embodiment of an optoelectrical network 300 performing downstream transmissions by employing time division multiplexing. Network 300 may comprise an OLT 310, an optical network 340, ONU 321 and ONU 322, electrical network 350, and terminal 331, terminal 332, terminal 333, terminal 334, terminal 335, and terminal 336, which may be substantially similar to OLT 110, optical network 140, ONUs 120, electrical network 150, and terminals 130, respectively. Network 300 may also be coupled in a substantially similar configuration to network 100.

OLT 310 may transmit data frame 342 downstream across the optical network 340. Data frame 342 may be an OSI layer two data construct and may comprise a header H and OSI layer three packets 1-6, as shown in FIG. 3. Data packets 1-6 may comprise data being transmitted toward terminals 331-336, respectively. Header H may comprise schedule data and/or other system control information from the OLT 310. It should be noted that data frame 342 is presented as an illustrative example and that a data frame may comprise any number of packets of varying lengths. It should also be noted that in some embodiments a data frame 342 may comprise multiple packets for some end nodes and no packets for other end nodes. An end node may be any node at the end of a path. For example, terminals 331-336 may act as end nodes in network 300. In alternate embodiments, some ONUs may also act as end nodes (e.g. in a fiber to the desktop embodiment).

ONUs 321 and 322 may receive and process data frame 342 based on the schedule information in header H and/or data in packets 1-6. For example, ONU 321 may be aware of connections to terminals 331-332, but not terminals 333-336. ONU 321 may covert the frame to the electrical domain, process the frame, and drop packets 3-6 as such packets are not directed to the terminals that are connected to ONU 321. ONU 321 may retain packets 1-2 in a queue and/or forward such packets toward terminals 331 and 332, respectively, over the electrical network. Likewise, ONU 322 may drop packets 1-2 as irrelevant to terminals 333-336 and may forward packets 3-6. ONUs 321-322 may schedule downstream transmission timeslots 360 such that packets 1-2 and/or 3-6, respectively, may be transmitted downstream (e.g. inside frames) in a manner that optimizes for cross-talk. ONUs 321-322 may schedule the timeslots 360 based on schedule information in the header H (e.g. from the OLT 310).

The downstream transmissions from ONU 321 may be illustrative of a pure TDM scheduling scheme. In pure TDM, packets/frames from a common ONU (e.g. ONU 321) may be scheduled so that transmissions across the electrical network 350 may not temporally overlap. For example, packet 2 may be transmitted prior to packet 1 and the transmissions may be coordinated so the transmission of packet 2 is completed before packet 1 may be sent on a related line. As the electrical lines may be deactivated when not transmitting data, the transmission of packet 2 may not cause cross-talk that affects the signal quality of packet 1 or vice versa. It should be noted that even in pure TDM, transmissions over electrical lines that are not connected to a common ONU may not be coordinated. Coordination between ONUs may not be employed because inter-ONU cross-talk may not typically occur as spacing of the ONUs may separate the electrical lines sufficiently to avoid cross-talk.

The downstream transmissions from ONU 322 may be illustrative of a semi-TDM scheduling scheme. In cases where an ONU, such as ONU 322, services many terminals (e.g. terminals 333-336) a pure TDM scheme may result in network congestion. In that case, the requirements of pure-TDM may be relaxed to allow overlapping transmissions as long as measured/projected cross-talk remains below a pre-determined threshold. For purposes of illustration, lines (e.g. of the electrical network 350) are denoted herein in the form of x-y, where x and y denote the upstream and downstream end nodes, respectively. For example, electrical line ONU 322-terminal 333 may connect to a common ONU with electrical line ONU 322-terminal 336, but such lines may not be positioned in close proximity beyond the connection point and/or may be configured in such a way as to experience acceptable levels of cross-talk (e.g. due to cross-talk shielding, etc.). OLT 310 may measure cross-talk during a diagnostic phase and may determine that cross-talk between line ONU 322-terminal 333 and line ONU 322-terminal 336 does not exceed a pre-determined threshold. Such threshold may be set by the network 300 as a design constraint, entered by an administrator, etc. Since the cross-talk between such lines is deemed acceptable, transmission of packets 3 and 6 may be allowed to temporally overlap. As another example, cross-talk between lines ONU 322-terminal 334 and lines ONU 322-terminal 335 may exceed the threshold, which may require packets 4 and 5 to be transmitted in a non-temporally overlapping manner to mitigate such cross-talk.

As noted above, header H may comprise scheduling information such as timeslots 360, which may be used to schedule transmissions of packets 1-6. Header H may also comprise a cross-talk compensation matrix ($M^{-1}$), which may comprise values calculated by the OLT 310, which may be employed by the ONUs 321-322 and/or terminals 331-336 to compensate for cross-talk. By reducing the amount of cross-talk via TDM, the size of $M^{-1}$ may be reduced, which may reduce computational requirements of all network 300 components and may reduce the amount of control data transmitted across network 300. Reduction in cross-talk may also reduce the amount of data lost due to cross-talk related signal measurement errors, which may reduce the number of associated retransmissions. Deactivating the electrical lines of network 350 may also reduce power requirements of ONUs 321-322 and terminals 331-336. It should also be noted that header H may comprise scheduling information which may be employed by the terminals 331-336 to manage upstream scheduling as discussed below. Such information may be removed from data frame 342 by the ONUs 321-322 and forwarded to terminals 331-336 in headers attached to packets 1-6 (not shown) on an as needed basis.

Figure 4:
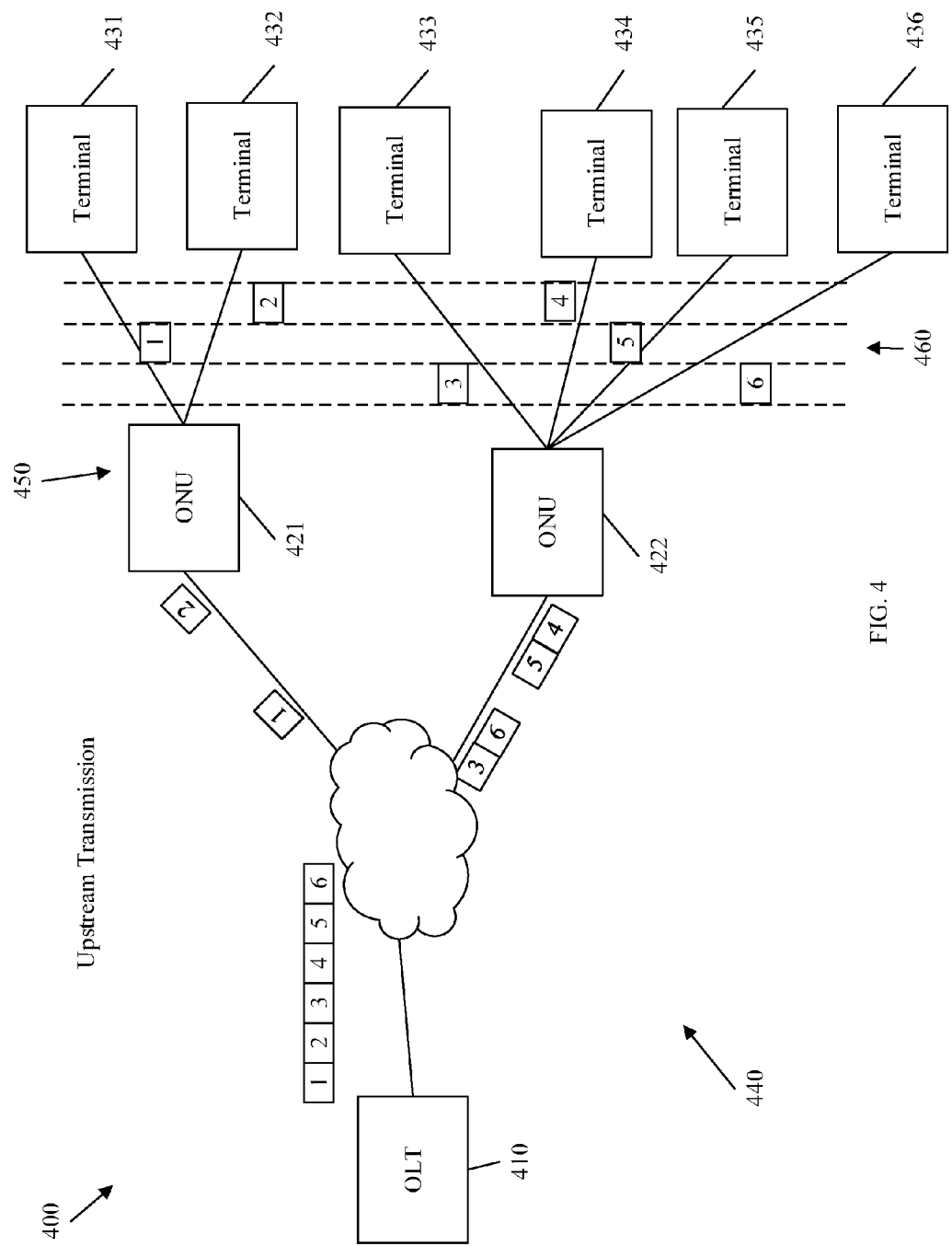
FIG. 4 is a schematic diagram of an embodiment of an optoelectrical network performing upstream transmissions by employing time division multiplexing.

FIG. 4 is a schematic diagram of an embodiment of an optoelectrical network 400 performing upstream transmissions by employing time division multiplexing. Network 400 may comprise an OLT 410, an optical network 440, ONU 421 and ONU 422, electrical network 450, and terminal 431, terminal 432, terminal 433, terminal 434, terminal 435, and terminal 436, which may be substantially similar to OLT 310, optical network 340, ONUs 321-322, electrical network 350, and terminals 330-336, respectively. Network 400 may also be coupled in a substantially similar configuration to networks 100 and 300. Network 400 may also employ upstream transmission timeslots 460, which may be substantially similar to downstream transmission timeslots 360, but may be employed for scheduling upstream transmissions.

OLT 410 may schedule upstream transmissions in substantially the same manner as downstream transmissions. The OLT 410 may include schedule data in the header of a downstream data transmission, and ONUs 421-422 and/or terminals 431-436 may employ the schedule data from the downstream data transmissions to schedule associated upstream transmissions. As with network 300, data packets 1 and 2 may be scheduled via a pure TDM scheme and data packets 3-6 may be scheduled via a semi-TDM scheme (e.g. to optimize for electrical cross-talk). Data packets 1-2 may be transmitted upstream across the electrical network 450 during timeslots 460 from transmitters 431 and 432 to ONU 421. ONU 421 may convert the signals from the electrical domain to the optical domain and forward the packets/frames across the optical network 440 toward the OLT 410. Likewise, data packets 3-6 may be transmitted across the electrical network 450 to ONE 422 for retransmission across the optical network 440. Such optical transmissions may also employ TDM and/or related protocols. Data packets 1-6 may be merged by components in the optical network 440 and/or forwarded to the OLT 410 for network management purposes and/or for retransmission across the Internet.

In some embodiments, the transmissions of network 300 and the transmissions of network 400 may be performed substantially simultaneously. For example, upstream transmissions and downstream transmissions may be sent during overlapping time-slots using frequency division multiplexing. In such a case, upstream scheduling may be performed in conjunction with downstream scheduling to prevent temporal overlaps in bi-directional communications in cross-talking lines in order to optimize for bi-directional cross-talk. In another embodiment, upstream communications and downstream communications may be separated into different cycles to prevent bi-direction communication related cross-talk.

Figure 5:
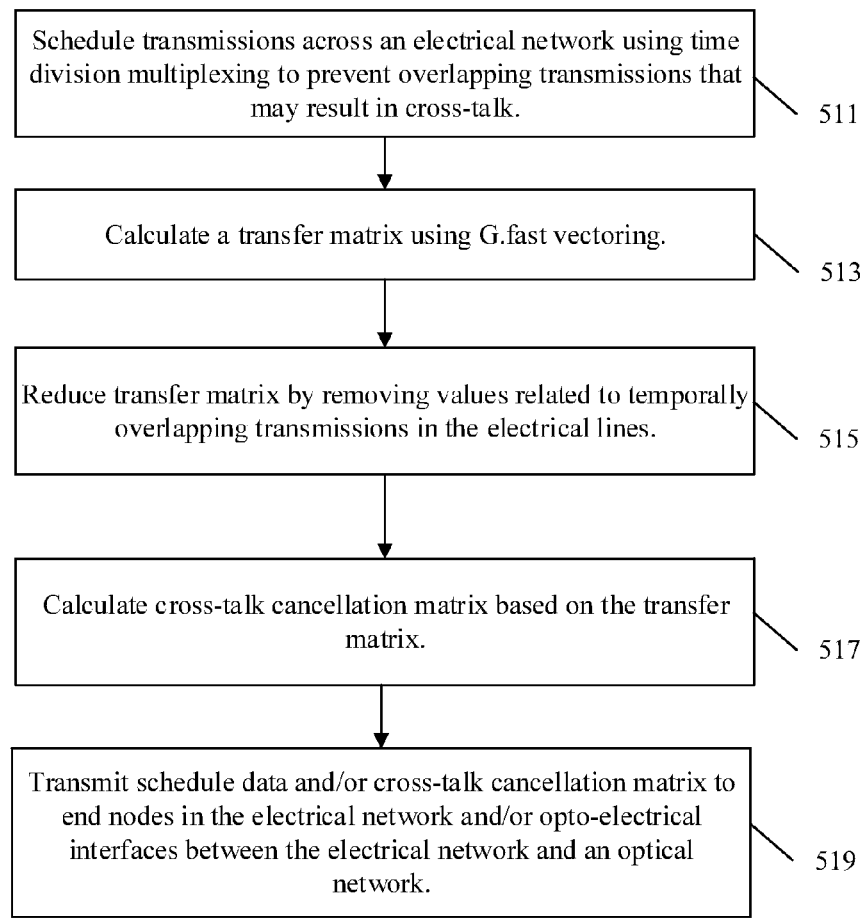
FIG. 5 is a flowchart of an embodiment of a method of time division multiplexing over an optoelectrical network.

FIG. 5 is a flowchart of an embodiment of a method 500 of time division multiplexing over an optoelectrical network such as network 100, 300, and/or 400. Method 500 may be implemented in a NE, such as NE 200, which may operate as a node in network 100, 300, and/or 400. At step 511, transmissions across the electrical network (e.g. downstream and/or upstream) may be scheduled by employing pure and/or semi-TDM to prevent temporally overlapping transmissions that may result in unacceptable cross-talk (e.g. cross-talk exceeding a threshold, etc.). At step 513, a transfer matrix may be calculated using G.fast vectoring. Specifically, signal transmissions over multiple electrical (e.g. DSL) lines may be represented by equation 1.

$$Vo = M * Vi \qquad \text{Equation 1}$$

where Vo represents a sending signal matrix, Vi represents a receiving signal matrix, and M represents a transfer matrix that represents an estimate of characteristics of the electrical lines and associated media.

At step 515, the transfer matrix M may be reduced by removing values associated with temporally overlapping transmissions in the electrical lines. In a first embodiment, a cross-talking line may be completely muted while associated line(s) are transmitting. In such a case, the transmitters may not transmit and the receivers may not receive. M may therefore be substantially reduced by removing all rows and columns associated with the muted lines. In a second embodiment, some receiver values may be retained to reduce potential loss of electrical signal information. In such a case, rows/columns associated with muted transmitters may be removed. Rows/columns associated with lines with cross-talk above a threshold may also be removed because large cross-talk values may significantly complicate the vectoring process as discussed below. However, rows/columns associated with receivers on muted lines with acceptable cross-talk values may be retained as such values may not substantially complicate the vectoring process.

At step 517, a cross-talk cancellation matrix M may be calculated based on the transfer matrix M. Specifically, a vectoring cross-talk cancellation matrix $M^{-1}$ may be calculated by employing equation 2.

$$Vo' = M^{-1} * Vo = M^{-1}(M*Vi) \qquad \text{Equation 2}$$

where $M^{-1}$ is the crosstalk cancellation matrix and where $M^{-1}$ is the inverse of M. It should be noted that the complexity of the mathematical operation of calculating an inverse matrix as well as the size of the resulting inverse matrix exponentially increase as the complexity of the underlying matrix increases. As such, decreasing the complexity of M by removing large cross-talk values (e.g. values of rows that are substantially similar and that indicate the associated lines are close to degeneracy) pursuant to TDM based cross-talk optimization may substantially reduce the computational complexity and size of $M^{-1}$. In some embodiments, M may be calculated twice at step 515 based on the first embodiment and second embodiment as discussed hereinabove. In such a case, $M^{-1}$ may be calculated based on each embodiment and the result averaged to create a cross-talk cancellation matrix that acts as a weighted average of both embodiments.

At step 519 the schedule data and/or cross-talk cancellation matrix $M^{-1}$ may be transmitted to end nodes in the electrical network (e.g. terminals 130, 331-336, and/or 431-436) and/or opto-electrical interfaces (e.g. ONUs 120, 321-322, and/or 421-422) positioned between the electrical network and an optical network. The opto-electrical interfaces and/or end nodes may schedule transmissions across the network according to the schedule data and/or compensate for cross-talk based on the reduced $M^{-1}$.

By implementing method 500, an electrical network with muted lines may be considered an IxO multiple Input Multiple Output (MIMO) channel where the number of inputs (I) may be less than the number of outputs (O). According the method 500, the inputs may be estimated such that any associated Root Mean Square (RMS) error may be minimized.

At least one embodiment is disclosed and variations, combinations, and/or modifications of the embodiment(s) and/or features of the embodiment(s) made by a person having ordinary skill in the art are within the scope of the disclosure.

Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

We claim:

1. An optical management node comprising:
 a memory comprising instructions;
 a processor coupled to the memory and configured to execute the instructions, wherein executing the instructions causes the processor to schedule data transmissions across an electrical network between a plurality of user terminals and an optoelectrical interface by using time division multiplexing or time division multiple access based on optimization of crosstalk performance of electrical lines of the electrical network; and
 a transmitter coupled to the processor and configured to transmit schedule information to the optoelectrical interface via an optical network,
 wherein scheduling data transmissions comprises disallowing temporally overlapping data transmissions on at least one of the electrical lines with respect to a second electrical line when a calculated cross-talk value associated with the at least one electrical line is greater than a pre-determined threshold.

2. The optical management node of claim 1, wherein data transmissions are scheduled based on a presumption that the electrical lines are substantially electrically inactive when not transmitting data.

3. The optical management node of claim 1, wherein the schedule information directs electrical transmitters to enter an inactive state when not transmitting data.

4. The optical management node of claim 1, wherein the optical management node comprises an Optical Line Terminal (OLT), wherein the optical network comprises a Passive Optical Network (PON), wherein the optoelectrical interface comprises a plurality of Optical Network Units (ONUs), and wherein the electrical network comprises a Digital Subscriber Line (DSL) network.

5. The optical management node of claim 4, wherein scheduling data transmissions further comprises disallowing temporally overlapping data transmissions on electrical lines coupled to a common ONU.

6. The optical management node of claim 4, wherein optimization of crosstalk performance is based on physical proximity of the electrical lines.

7. The optical management node of claim 4, wherein the transmitter is further configured to transmit the data transmissions in at least one frame, and wherein the schedule information is encoded in a header of the frame.

8. The optical management node of claim 7, wherein the frame is formatted to support time division multiplexing or time division multiple access at the ONUs.

9. A method implemented in a management node comprising:
 scheduling data transmissions with a plurality of user terminals across a Digital Subscriber Line (DSL) network using time division scheduling based on optimization of crosstalk performance of DSL lines of the DSL network; and
 transmitting schedule information to the user terminals via an optical network,
 wherein time division scheduling comprises disallowing temporally overlapping upstream data transmissions on a plurality of the DSL lines when a calculated cross-talk value for the DSL lines is greater than a pre-determined threshold.

10. The method of claim 9, wherein time division scheduling further comprises scheduling data transmissions by disallowing temporally overlapping upstream data transmissions on a plurality of the DSL lines coupled to a common optoelectrical interface.

11. The method of claim 9, wherein the schedule information is transmitted from an Optical Line Terminal (OLT) in a header of a downstream data frame.

12. The method of claim 9, wherein the data transmissions are scheduled to support combining upstream data transmissions from the DSL lines at an optoelectrical interface.

\* \* \* \* \*